March 30, 1926.　　　　　　　　　1,578,906
E. M. MOREL
MOTOR CYCLE
Filed May 28, 1923
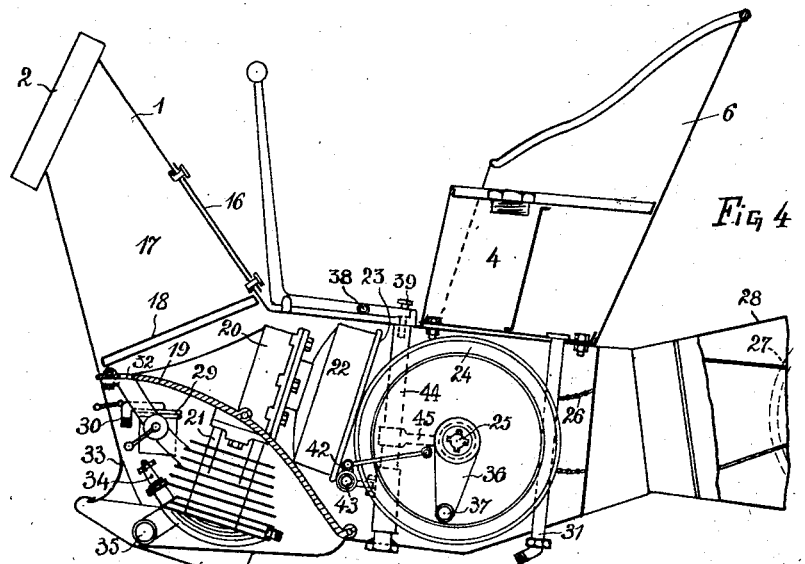
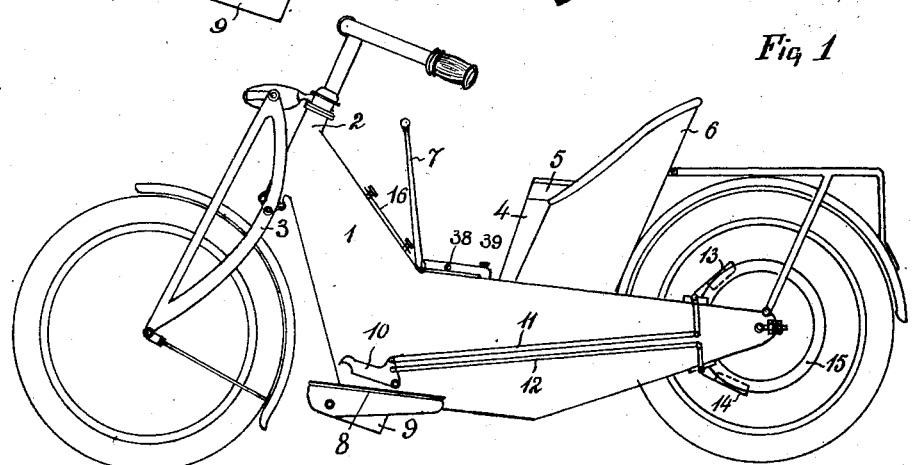
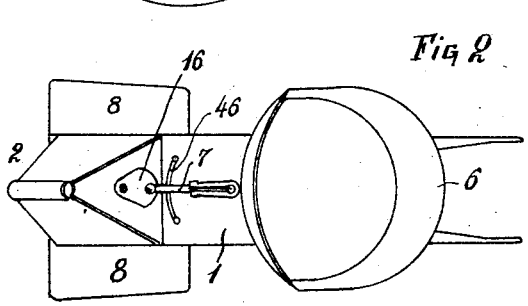
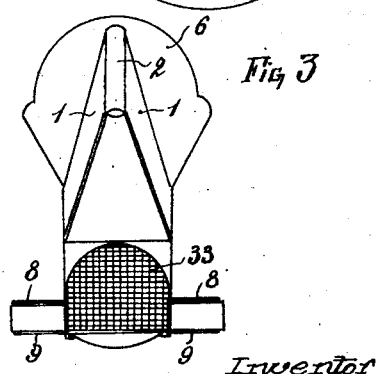
Inventor
E. M. Morel
By Markes Clark Patented Mar. 30, 1926.

1,578,906

UNITED STATES PATENT OFFICE.

EUGENE MARIE MOREL, OF BRUSSELS, BELGIUM, ASSIGNOR TO SOCIÉTÉ ANONYME DES ANCIENS ETABLISSEMENTS CH. FONDES, OF VILVORDE, BELGIUM, A BELGIAN COMPANY.

MOTOR CYCLE.

Application filed May 28, 1923. Serial No. 642,074.

*To all whom it may concern:*

Be it known that I, EUGENE MARIE MOREL, a citizen of the Republic of France, residing at Brussels, Belgium, 19 Rue des Ateliers, have invented certain new and useful Improvements in Motor Cycles, of which the following is a specification.

The present invention relates to motor cycles and consists in improvements in the design and arrangement thereof.

Driving motor cycles, such as are built almost universally at present imposes on the driver the necessity of bestriding the machine and straddling the engine and transmission members installed on the truss forming the frame placed on the supporting wheels.

Moreover, the said members are ordinarily left uncovered so that on this account they are very poorly protected against shocks, breakdowns, dust and mud, etc.

The motor-cycle arrangement according to the present invention is intended to do away with the above inconveniences, and includes for this purpose a specially shaped frame, such that the driver is no longer in a saddle, but seated comfortably on the machine, the parts of the engine and of the transmission etc., being, moreover, placed within the frame, which, by its design and its arrangement, forms a sort of case, completely closed.

In a general way, the frame may be composed of a pressed metallic sheet or may comprise a combination of pressed metal sheets and metallic plates suitably assembled, taking lengthwise of the machine the shape of a very open V with the point directed forwardly and downwardly so that one of the limbs of the V, in this case the rear limb will become approximately horizontal.

According to another feature of the invention, the side shields or flanks of the above described frame are dimensioned and sufficiently separated from each other so that the engine and the transmission members may be placed inside the frame, the motor being installed preferably in the external angle of the V, the cylinder pointing obliquely downwards, the inside partitions and the openings in the walls of the frame being arranged so that the cylinder of the engine is uncovered except on the sides.

Other less essential features of the arrangement will appear more clearly in the following description of one way of carrying out the invention, and described below with reference to the accompanying drawings, in which:

Fig. 1 is an external side view of a motor-cycle arrangement according to the present invention;

Fig. 2 is a diagrammatic plan, viewed from above of the machine.

Fig. 3 is a diagrammatic end view, looking from a position in front of the machine, and Fig. 4 is a partial side elevation of the frame, one of the side shields being removed in order to show the arrangement of the parts placed inside the frame and showing by part the supplementary casing for the chain of the vehicle.

The same reference characters designate the same parts in the various figures, and, as shown in Fig. 1, 1 designates the frame formed by a piece of pressed metal sheet having, preferably, a rectangular cross section and a longitudinal section in the shape of a very open V, the opening of which is turned upward towards the rear; so that the rear leg is approximately horizontal. The end of the front part forms, or is connected to, the steering tube 2 of the front fork 3, which may be of any suitable type.

The frame such as described will be obtained preferably by uniting two pressed members having a U shaped cross section, the webs forming the side shields of the frame and the flanges forming, respectively, half the width of the upper part and half the width of the lower part, an additional width being provided in each case for making the connection. The latter may be made by welding, bolting, or in any other suitable way, the dimensions of the pressed parts being such that the whole has sufficient stiffness and strength and that sufficient space is obtained inside the frame for placing the engine, the transmission members, and accessories.

The rear extensions of the side shields, also provided with small upper and lower reinforcing flanges, form the supports for the rear wheel as shown in Figures 1 and 6.

It is to be noted that the frame can also be built by assembling its various members or parts such as upper plate, shield, lower plate, or by separately combining the pressed shapes forming its different parts, such as front leg, rear leg, etc., and that the frame may also have a cross section differing from a rectangle, such as a trapezodial cross section, provided that the assembly, taken as a whole, has a shape according to the invention, and carries out the purpose of the latter.

The oil and gasoline tank 4 is fastened on the upper side and near the middle of the rear leg of the frame, the upper part of the tank forming a base for the driver's seat. This seat is completed by a separate back 6, the lower part of which surrounds the tank 4. This back is attached to the upper plate of the frame in any suitable way, for example by bolts, as shown in the drawings.

As shown particularly in Figure 4, the engine 20 is placed, cylinder down, in the lower forward angle of the frame, and fastened in this position to an interior partition 19, which is shown slightly arched, welded or otherwise fastened to the sides of the frame and having no other opening than that necessary for receiving the cylinder 21.

The lower front part of the frame, into which the cylinder 21 projects, has suitably dimensioned openings, particularly in the front lower side, for the purpose of cooling the cylinder. These openings are covered by a metallic screen 33 as shown in Figures 3 and 4.

The engine exhaust pipe 35 is divided into two lateral branches connected to two mufflers 9 outside the frame. These mufflers are advantageously used as bases for the foot rests and as a consequence, during cold weather, the driver's feet will be warmed, and during hot weather he may interpose heat insulating material so as to prevent excessive warming.

In the ordinary way the engine 20 is fitted with a flywheel 22 which also forms the magneto, the rear side being made so as to form a clutch and speed changing device in combination with the friction disc 24.

For this purpose the disc 24 is mounted on a shaft 25 so that it turns with the shaft but can slide lengthwise along the shaft.

The movement of the disc on the shaft can only take place at one end of the latter (the end opposite the chain driving the rear wheel) and the shaft 25 is mounted in self aligning bearings one of which is placed on the same side as the chain driving the rear wheel, while the other is mounted at the end of a rod 36 jointed at 37 on a pin attached to the frame. The rod 36 is oscillated by the rod 41 pivoted to the end of a bell crank lever 42 articulated at 43 and moved by means of the combination of lever 7 and lever 44.

The lever 7 operated by the driver pivots at 38 about a shaft supported in bearings attached to the upper plate of the frame, and the lever 44 is articulated at a universal joint 40 attached to the lower plate.

Moreover, the connection 39 between the two levers is such that the extent of movement of the lever 44 may be regulated, and it is easily understood that moving the upper part of lever 7 backwards separate the disc 24 from the flywheel 22 and declutches the shaft 25.

On the other hand, the lever 7 may also be oscillated in the horizontal plane of its pivots 38, which causes lever 44 to oscillate in a vertical plane and displaces the friction disc 24 along the shaft 25 by means of the jaws 45 which engage the said disc.

In this way, the disc bears on and is driven by the flywheel at different distances from the center of rotation of the latter, which gives a change of speed. The lever 7 is maintained in the position in which it has been placed by the driver, by the engagement under pressure of an external projection at this front bent part with the sector 46 shown in Fig. 2.

The rotation of the shaft 25 is transmitted to the rear wheel by means of a sprocket mounted on the said shaft, together with the chain 26 and the corresponding sprocket on the rear wheel 27.

This transmission is also enclosed in a case designated by 28, Figure 4.

An additional partition 18 is provided in the front leg 17 of the frame, forming a box for tools or other material in the upper part of the said leg. This box is preferably closed by a door 16 as shown.

The engine accessories, such as the carburettor 29 and the spark plug 34 are placed as shown below the partition 19 and opposite the opening covered by the metallic screen 33 so that they are easily accessible when the said screen is removed.

It will be noted that the air for the engine mixture is drawn in through the opening 32 in the plate 19, and consequently comes from the practically enclosed space in which all the transmission members are enclosed and sheltered from the road duct, etc.

The gasoline piping 31 coming from the tank 4 connects at 30 with the carburettor 29 through a pipe which is not shown for the sake of clearness of the drawing.

The arrangement is completed by a foot brake 10 which operates simultaneously the two brakes 13 and 14 by means of the rods 11 and 12. The brakes 13 and 14 act on a grooved pulley 15. This brake mechanism does away with the disadvantages of a single brake and the danger of breaking the latter.

Finally, and in the usual way, the spark and carburettor control levers are placed on the handle bars.

It is to be understood that various modifications may be made in the arrangement described and claimed below and particularly that the engine may be placed differently, may have several cylinders, etc., also that the clutch and speed changing mechanism may be different.

Having now particularly described and ascertained the nature of my invention and in what manner the same is to be performed, I declare that what I claim is:—

1. A motor cycle, a closed frame of V shaped form composed of laterally U shaped members welded together, a motor and transmission members enclosed by the said frame and disposed so that the cylinder of the motor is pointing downwardly and located in the exterior angle of the V of the frame.

2. In a motor cycle, a closed frame of V shaped form composed of laterally U shaped members, a motor and transmission members, a partition in the frame dividing the same into two chambers and provided with an opening for receiving the cylinder of the motor, and the partition being so disposed as to insulate the cylinder of the motor in one of the chambers of the frame.

3. In a motor cycle, a closed frame of V shaped form, a partition in the frame forming a chamber in the angle of the V of the frame and provided with an opening, a motor disposed within the frame with the cylinder thereof passing through the opening in the partition and located within the said chamber, and means for admitting air to the chamber when the motor cycle is running.

4. In a motor cycle, a closed frame of V shaped form, an insulated chamber in the angle of the V of the frame, a motor disposed within the frame with the cylinder thereof located in said chamber, means for admitting air to the chamber when the motor cycle is running, said means consisting of apertures provided in the front and inferior walls of the frame.

5. In a motor cycle, a closed frame of V shaped form, a partition extending inside the frame so as to form an insulated chamber in the angle of the V, a motor and transmission members disposed within the frame with the motor cylinder pointing down within the chamber, the front and inferior walls of the frame having openings so as to form an air channel for the cooling of the cylinder, means whereby combustion air is admitted to the cylinder, said air being drawn from the closed space of the frame.

6. In a motor cycle, a closed frame of V shaped form the rear leg of which is substantially horizontal, oil and gasoline tanks located above the frame and fastened on the rear leg thereof, said tanks serving as a base for the driver's seat.

In testimony whereof I hereunto affix my signature.

EUGENE MARIE MOREL.

Certificate of Correction.

It is hereby certified that the name of the assignee in Letters Patent No. 1,578,906, granted March 30, 1926, upon the application of Eugene Marie Morel, of Brussels, Belgium, for an improvement in "Motor Cycles," was erroneously written and printed as "Société Anonyme des Anciens Établissements Ch. Fondes," whereas said name should have been written and printed as *Société Anonyme des Anciens Etablissements Ch. Fondu*, as shown by the records of assignments in this office; and that the said Letters Patent should be read with this correction therein that the same may conform to the record of the case in the Patent Office.

Signed and sealed this 1st day of June, A. D. 1926.

[SEAL.]
M. J. MOORE,
*Acting Commissioner of Patents.*